United States Patent [19]
Katsumata et al.

[11] Patent Number: 4,853,765
[45] Date of Patent: Aug. 1, 1989

[54] SEQUENTIAL SCANNING CONVERTER WITH FRAME COMB FILTER AND FREEZE FRAME FEATURE

[75] Inventors: Kenji Katsumata; Masato Sugiyama; Takaaki Matono; Shigeru Hirahata; Isao Nakagawa, all of Yokohama; Kazuo Ishikura, Hachioji; Sunao Suzuki, Kamakura, all of Japan

[73] Assignee: Hitachi, Ltd., Tokyo, Japan

[21] Appl. No.: 186,164

[22] Filed: Apr. 26, 1988

[30] Foreign Application Priority Data

Apr. 30, 1987 [JP] Japan .................. 62-104331

[51] Int. Cl.$^4$ .................. H04N 11/02; H04N 7/01
[52] U.S. Cl. .................. 358/11; 358/22; 358/31; 358/140
[58] Field of Search .................. 358/11, 21 R, 22, 31, 358/140

[56] References Cited

U.S. PATENT DOCUMENTS

| | | | |
|---|---|---|---|
| 4,498,100 | 2/1985 | Bunting et al. | 358/31 |
| 4,641,188 | 2/1987 | Dischert | 358/140 |
| 4,672,445 | 6/1987 | Casey et al. | 358/140 |
| 4,701,785 | 10/1987 | Willis | 358/22 |
| 4,768,095 | 8/1988 | Wada et al. | 358/22 |
| 4,774,582 | 9/1988 | Hakamada | 358/22 |

FOREIGN PATENT DOCUMENTS

| | | | |
|---|---|---|---|
| 138325 | 10/1979 | Japan . | |
| 140828 | 11/1979 | Japan . | |
| 48690 | 3/1985 | Japan | 358/31 |
| 51091 | 3/1985 | Japan | 358/21 R |
| 117987 | 6/1985 | Japan | 358/21 R |
| 182283 | 9/1985 | Japan . | |

Primary Examiner—John W. Shepperd
Attorney, Agent, or Firm—Antonelli, Terry & Wands

[57] ABSTRACT

A video signal processing circuit capable of reproducing a still picture signal from a color video signal comprises a luminance signal/chrominance signal separation circuit of a motion adaptive type, a scanning line interpolation circuit of a motion adaptive type connected with the separation circuit, a first memory connected with the separation circuit to store therein the output of the separation circuit, a second memory connected with the interpolation circuit to store therein the output of the interpolation circuit and a switching circuit for delivering therethrough the outputs of said first and second memories as a first output signal alternately and for delivering therethrough the outputs of said second and first memories as a second output signal alternately, the alternation for the delivery by the switching circuit being effected at a frequency identical with the field frequency of the video signal.

5 Claims, 10 Drawing Sheets

—— n-th FIELD SCANNING LINES
---- (n+1)-th FIELD SCANNING LINES

SEQUENTIAL SCANNING CONVERTER WITH FRAME COMB FILTER AND FREEZE FRAME FEATURE

BACKGROUND OF THE INVENTION

This invention relates to a video signal processing circuit operative to reproduce still pictures from a color video signal.

The technical development is under way for upgrading the picture displayed on a color television receiver, VTR, video disc player, etc. for example, through the digital signal processing for the color television signal. The achievement of upgraded picture quality is a crucial technical theme especially for the color television receiver, and it is going to be attained by the developments of the comb filter circuit using a digital memory, the scanning line interpolation circuit, and the motion detecting circuit, as disclosed in JP-A No. 54-138325 (laid open on Oct. 26, 1979) and JP-A No. 61-15635 (laid open on Apr. 25, 1986). In another direction of digital processing, attempts have been made for the specific reproduction of pictures using a capacious memory. The specific reproduction is a function such as picture freezing and combined reproduction of a main and subordinate pictures (so-called "picture-in-picture" or "PinP"), and various methods have already been proposed.

Figure 1A:
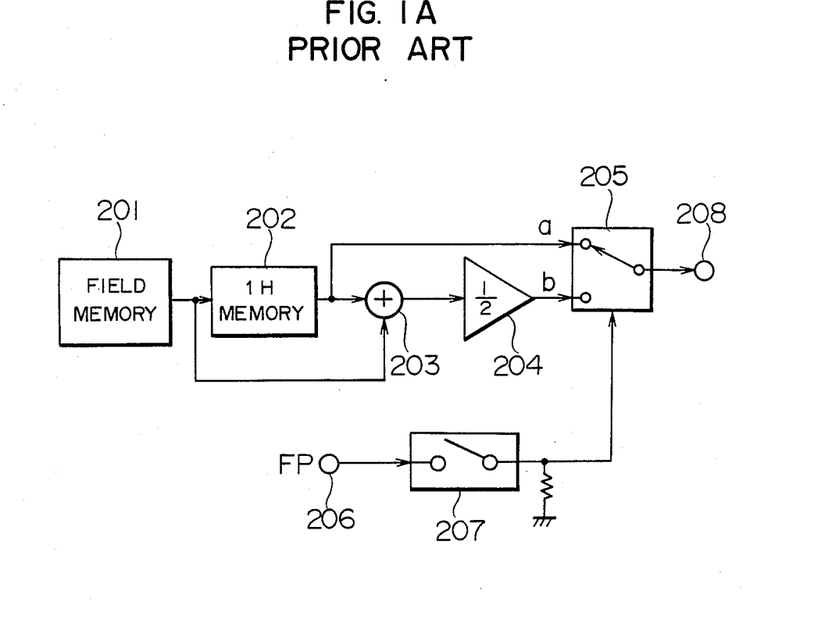
FIG. 1A is a block diagram showing an example of the conventional signal processing circuit for picture freezing.
Figure 1B:
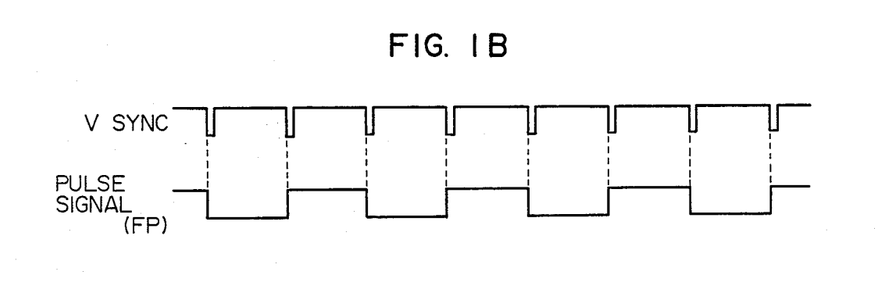
FIG. 1B is a timing chart used to explain the freezing operation by the circuit shown in FIG. 1A.

For example, disclosed in JP-A No. 61-182283 (laid open on Sept. 17, 1985) is pertinent to picture freezing. This system will be briefed on the block diagram of FIG. 1A. In the figure, indicated by 201 is a field memory for storing a field of picture signal, 202 is a 1H memory for delaying the output signal of the field memory 201 by one scanning line, 203 is an adder for summing the input and output signals of the 1H memory 202, 204 is a coefficient multiplier which halves the output signal of the adder 203, 205 is a switch circuit for selecting one of output signals of the 1H memory 202 and coefficient multiplier 204, 206 is an input terminal for receiving the frame sync pulse signal FP shown in FIG. 1B, 207 is a switch for conducting the control signal to the switch circuit 205, and 208 is an output terminal for delivering the still picture signal.

In this conventional system, a field of picture signal is read out of the field memory 201 iteratively to display a still picture, i.e., frozen picture. In this case, if the switch 207 is turned off, causing the switch circuit 205 to be set to the a-position invariably, the output terminal 208 delivers the same signal for every field. Accordingly, by adjusting the read-out timing for the field memory 201, a non-interlaced scanning picture, e.g., a field-freeze picture having 262 scanning lines for each field can be displayed. If, on the other hand, the switch 207 is turned on, causing the switch circuit 205 to be controlled by the frame pulse FP supplied on the input, terminal 206, the switch circuit 205 is set to the a or b-position alternately in every second field. Consequently, the output terminal 208 delivers the signal of the field memory 201 in the a-position of the switch circuit 205 in the n-th field, and delivers the interpolated signal in the b-position of the switch circuit 205 produced by the filter circuit made up of the 1H memory 202, adder 203 and coefficient multiplier 204 in the (n+1)th field. Namely, the system provides a pseudo frame-freeze picture with a pseudo interlaced structure having 525 scanning lines.

The above conventional system allows the selection of field freeze and pseudo frame freeze depending on the nature of the picture signal stored in the field memory 201, whereby a still picture without quiver can be displayed. However, any of the field-freeze picture an pseudo frame-freeze picture is low in resolution, i.e., half as much scanning lines as the normally reproduced picture, and this is a problem from the viewpoint of upgrading the picture quality.

With the intention of improving the resolution, a complete frame of picture signal can be stored and read out iteratively to display a frame-freeze picture. However, it creates double images (quiver) at a moving portion of picture, and therefore upgrading of picture quality cannot be expected.

The following U.S. patent applications are cited as related applications:

(a) U.S. patent application Ser. No. 932,376, now U.S. Pat. No. 4,736,252 filed on Nov. 20, 1986, entitled "MOTION DETECTOR FOR CHROMINANCE SIGNAL IN TV RECEIVER";

(b) U.S. patent application Ser. No. 938,962, now U.S. Pat. No. 4,733,247 filed on Dec. 8, 1986, entitled "CONTOUR SIGNAL CORRECTION CIRCUIT FOR TELEVISION RECEIVER";

(c) U.S. patent application Ser. No. 36,431, now U.S. Pat. No. 4,733,247 filed on Apr. 9, 1987, entitled "VIDEO SIGNAL PROCESSING CIRCUIT OF MOTION-ADAPTIVE TYPE";

(d) U.S. patent application Ser. No. 63,477, filed on Jun. 18, 1987, entitled "DETECTION CIRCUIT FOR DETECTING STANDARD TELEVISION SIGNAL"; and (e) U.S. patent application Ser. No. 164,914 filed on Mar. 7, 1988, entitled "SIGNAL PROCESSING CIRCUIT USED IN TELEVISION RECEIVER FOR PROCESSING STANDARD AND NON-STANDARD TELEVISION SIGNALS" (based on Japanese Patent Application No. 62-51909, filed on Mar. 9, 1987).

Furthermore, U.S. Pat. No. 4,641,188 to Dischert discloses a receiver including a line store progressive scan processor for doubling the line rate of a video input signal for display.

SUMMARY OF THE INVENTION

An object of this invention is to provide a video signal processing circuit capable of still picture reproduction which attains high quality frame freezing.

According to one aspect of this invention, a video signal processing circuit capable of reproducing a still picture from a color video signal, comprises: luminance signal/chrominance signal separation means arranged for receiving a color video signal; scanning line interpolation means in an electrical connection to receive the output of the separation means; first memory means in an electrical connection to receive and store therein the output of the separation means; second memory means in an electrical connection to receive and store therein the output of the interpolation means; and first and second switching means each connected to receive the outputs of the first and second memory means through switches, the first and second switching means being operable so that the first switching means delivers therethrough the outputs of the first and second memory means alternately and the second switching mean delivers therethrough the outputs of the second and first memory means alternately, the alternation for the delivery by said first and second switching means being effected at a frequency identical with the field frequency of the video signal.

According to another aspect of this invention, a signal processing circuit provided with a plurality of field memories for implementing luminance signal (Y)/chrominance signal (C) separation and scanning line interpolation and producing the real scanning line signal and interpolated scanning line signal, thereby reproducing the scanning video signal, comprises a first memory circuit which stores a field of output signal from a Y/C separation circuit of a motion-adaptive type, a second memory circuit which stores a field of output signal from a scanning line interpolation circuit of a motion-adaptive type, a memory reading circuit which reads out the signals in the first and second memories for each field, and a switch circuit which selects the output signal of the first or second field memory in every field to provide a real scanning line signal and interpolated scanning line signal of video signal for a still picture.

According to one embodiment of this invention, a plurality of field memories are used to implement Y/C separation of motion-adaptive type and scanning line interpolation of a motion-adaptive type, thereby upgrading the picture quality. The signal after motion-adaptive Y/C separation is stored in the first field memory and the signal after motion-adaptive scanning line interpolation is stored in the second field memory, and these signals are read out iteratively and a high-quality still picture after the motion-adaptive process is displayed. If, at recording, the first field of the interlaced signal were to be stored in the first and second memories, the first field would be reproduced correctly, but the second field would have the real and interpolated scanning lines replaced with each other, resulting in the replacement of the upper and lower of each 2-line pair on the display screen. The above mentioned switch circuit operates to switch the outputs of the first and second memories at the second field, whereby a still picture can be reproduced correctly inclusive of the second field. Consequently, a still picture can be reproduced in a correct relationship of scanning lines for both the first and second fields, and high-quality freezing is accomplished.

DESCRIPTION OF THE PREFERRED EMBODIMENTS

Figure 2:
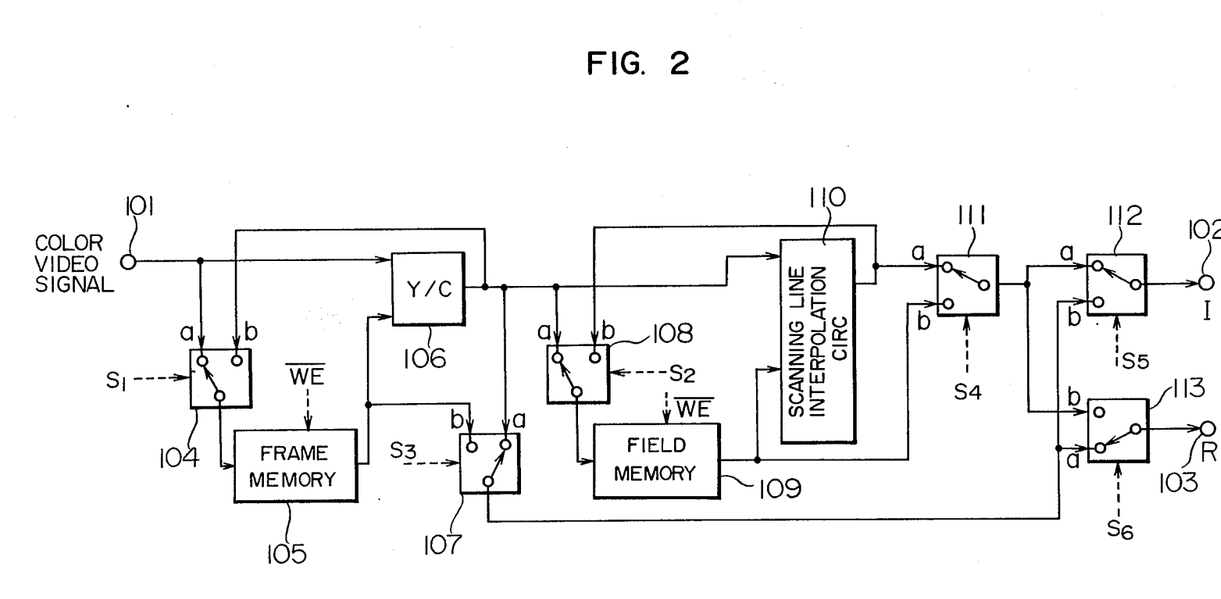
FIG. 2 is a block diagram of the signal processing circuit embodying this invention.
Figure 3:
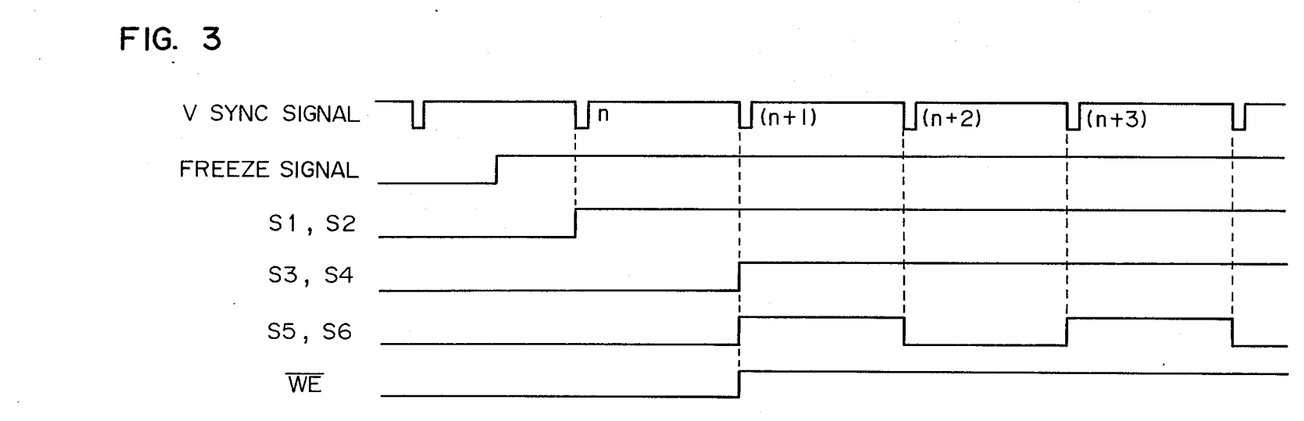
FIG. 3 is a timing chart for the signal which controls the freezing operation of the circuit shown in FIG. 2.
Figure 4:
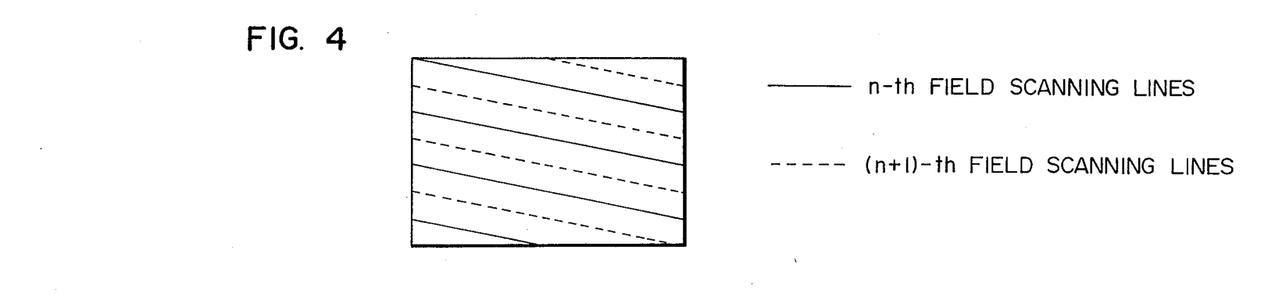
FIG. 4 is a diagram showing scanning lines of the interlaced scanning television signal.

FIG. 2 is a block diagram showing an embodiment of this invention, FIG. 3 is a timing chart of the signals for controlling the freezing operation of the circuit of FIG. 2, and FIG. 4 is a diagram showing scanning lines of the television signal. In FIG. 2, indicated by 101 is an input terminal for a color television signal, e.g., the NTSC signal, 102 is an output terminal for delivering the interpolated scanning line signal, and 103 is an output terminal for delivering the real scanning line signal. Indicated by 104, 107, 108, 111, 112 and 113 are switch circuits, 105 is a frame memory, 106 is a luminance signal (Y)/chrominance signal (C) separation circuit, and 110 is a scanning line interpolation circuit.

The Y/C separation circuit 106 and scanning line interpolation circuit may be, for example, those disclosed in U.S. Pat. No. 4,498,100 to Bunting et al and U.S. Pat. No. 4,672,445 to Casey et al, respectively.

The Y/C separation circuit 106 and frame memory 105 in unison constitute a luminance signal (Y)/chrominance signal (C) separation means. The scanning line interpolation circuit 110 and field memory 109 in unison constitute a scanning line interpolation means which is connected electrically to receive the output of the separation means. The field memory 105 also functions as a first memory for storing the output of the separation circuit 106 received through the switch circuit 104. Similarly, the field memory 109 also functions as a second memory for storing the output of the scanning line interpolation circuit 110 received through the switch circuit 108.

The normal reproduction process mode will be described first. In normal reproduction mode, the switch circuits are set to the a-position as shown in FIG. 2. Consequently, the signal produced by the Y/C separation circuit 106 is fed through the switch circuits 107 and 113 and delivered as a real scanning line signal (will be termed "R signal") from the output terminal 103. The Y/C separation circuit 106 has its output further received by the field memory 109 and scanning line interpolation circuit 110, by which the interpolation scanning line signal is produced. This signal is fed through the switch circuits 111 and 112 and delivered as an interpolated scanning line signal (will be termed "I signal") through the output terminal 102. The R and I signals are received by an enhancer circuit and scanning speed doubling circuit (not shown), by which a high quality video signal is produced.

Next, the still picture reproduction mode, i.e., picture freeze reproduction mode, will be described. The two switch circuits 104 and 108 are set to the b-position, as opposed to the state shown in FIG. 2, in synchronism with the vertical sync signal. The Y/C separation circuit 106 has its output signal stored in the frame memory 105, and the output signal from the scanning line interpolation circuit 110 is stored in the field memory 109. At this time, the control signals S1 and S2 of the switch circuits 104 and 108 go to a high level in response to the first vertical sync pulse following the rising edge of the freeze signal activated by the viewer, as shown in FIG. 3. After the R signal and I signal have been stored in the frame memory 105 and field memory 106, the memory write control signal $\overline{WE}$ goes to a high level to disable writing, as shown in FIG. 3, and the contents of the memories 105 and 109 are retained. After the memories have been written, the two switch circuits 107 and 111 are set to the b-position by the switch control signals S3 and S4, as shown in FIG. 3, and the same signals are read out of the frame memory 105 and field memory 109 for the respective fields.

The color television signal is an interlaced scanning signal as shown in FIG. 4, and an n-th field (n is an integer) includes signals of scanning lines shown by the solid lines in the figure, while a (n+1)th field includes signals of scanning lines shown by the dashed lines in the figure. Namely, for the n-th field, the solid lines of FIG. 4 are real scanning lines (R signal) and the dashed lines are interpolated scanning lines (I signal), and for the (n+1)th field, the dashed lines of FIG. 4 are real scanning lines (R signal) and the solid lines are interpolated scanning lines (I signal). Accordingly, when freezing commences at the n-th field for example, a signal read out of the frame memory 105 in a (n+2m)th field (m and n are integers) corresponds to a real scanning line signal, and a signal read out in a (n+2m+1)th field corresponds to an interpolated scanning line signal. A signal read out of the field memory 109 in the (n+2m)th field corresponds to an interpolated scanning line signal, and a signal read out in a (n+2m+1)th field corresponds to a real scanning line signal. On this account, two switch circuits 112 and 113 are provided to select signals in every field in response to the control signals S5 and S6, so that the output terminal 102 of the I signal always delivers interpolated scanning line signals and the output terminal 103 of the I signal always delivers real scanning line signals, thereby retaining the correct relationship of the real and interpolated scanning lines in frozen picture reproduction mode. This circuit arrangement attains high quality picture freezing without the need of alteration of the succeeding enhancer circuit, scanning speed doubling circuit, etc.

Figure 5:
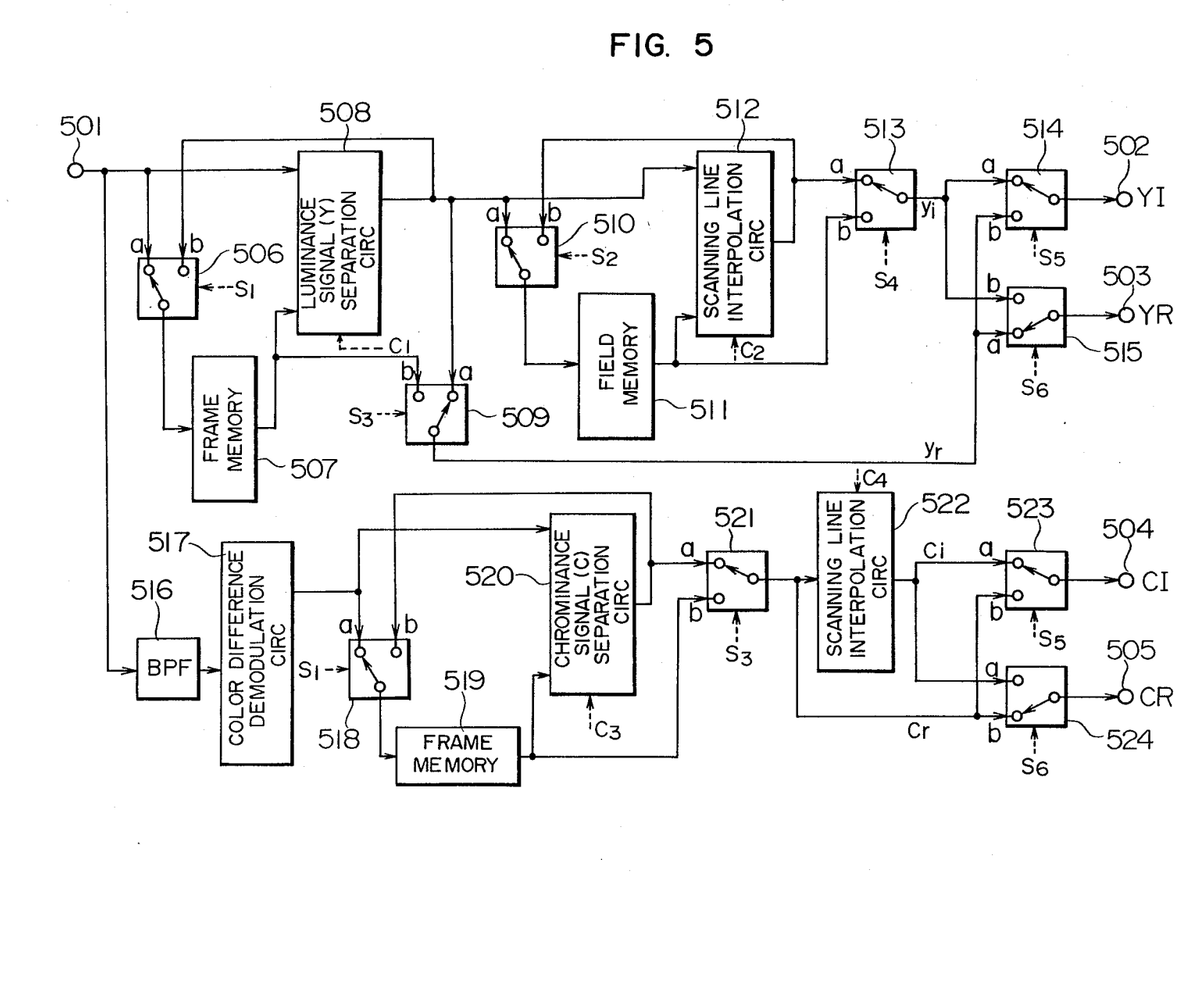
FIGS. 5, 6 and 8 are block diagrams of the signal processing circuits according to other embodiments of this invention.

The following describes another embodiment of this invention with reference to FIG. 5. In the figure, indicated by 501 is an input terminal for the digitized color television signal, 502 and 503 are output terminals for the interpolated scanning line signal and real scanning line signal of the luminance signal, 504 and 505 are output terminals for the interpolated scanning line signal and real scanning line signal of the chrominance signal, 506, 509, 510, 513, 514, 515, 518, 521, 523, and 524 are switch circuits, 507 and 519 are frame memories (first and second memory sections), 508 is a circuit which implements Y/C separation of motion-adaptive type to provide the luminance signal, 511 is a field memory (third memory section), 512 is a first scanning line interpolation circuit of motion-adaptive type, 516 is a band-pass filter, 517 is a color difference demodulation circuit, 520 is a circuit which implements Y/C separation of motion-adaptive type to provide the chrominance signal, and 522 is a second scanning line interpolation circuit of motion-adaptive type.

This embodiment adopts the component system which processes the input color television signal separately in the luminance signal processing system and chrominance signal processing system. Namely, the process following the band-pass filter 516 is the chrominance signal process, while the process following the switch circuit 506 and Y separation circuit 508 is the luminance signal process.

The Y separation circuit 507, frame memory 507, C separation circuit 520 and frame memory 519 in combination constitute a Y/C separation means which extracts the luminance signal and chrominance signal from the color television signal received on the terminal 501. The scanning line interpolation circuit 512, field memory 511 and scanning line interpolation circuit 522 in combination constitute a scanning line interpolation means which receives the output of the Y/C separation means. The frame memories 507 and 519 also function as a first and second memory sections which store the outputs of the separation circuits 508 and 520 received through the switch circuits 506 and 518. The field memory 511 also functions as a third memory section which stores the output of the scanning line interpolation circuit 512 received through the switch circuit 510.

In normal reproduction mode, the switch circuits are set to the a-position as shown in FIG. 5. In this state, the Y separation circuit of motion-adaptive type 508 implements the inter-frame signal processing using the input signal on the input terminal 501 and the output signal of the frame memory 507 or in-field signal processing to extract the luminance signal. Switching between the inter-frame signal processing and in-field signal processing is done by the control signal C1 provided by a known image motion detection means. The Y separation circuit of motion-adaptive type 508 has its output signal delivered as a real scanning line luminance signal YR through the output terminal 503 by way of the switch circuits 509 and 515. Delivered as an interpolated scanning line luminance signal Y1 through the output terminal 502 by way of the switch circuits 513 and 514 is the signal produced as a result of scanning line interpolation by inter-field signal processing using the field memory 511 or in-field signal processing by the scanning line interpolation circuit of motion-adaptive type 512. The scanning line interpolation circuit 512 is controlled by the control signal C2 produced by motion detection in the same way as Y separation.

In the chrominance signal processing system, after the signal has been passed through the band-pass filter 516 and color difference demodulation circuit 517, it is subjected to the process similar to the luminance signal processing system. Specifically, in this embodiment the field memory is not used for scanning line interpolation of the chrominance signal, but it is implemented within the field on the basis of correlation with the neighboring scanning lines. The scanning line interpolation circuit 522 is controlled by the correlation signal C4 based on the neighboring scanning lines. The resulting real scanning line signals YR and CR and interpolated scanning line signals YI and CI of the luminance and chrominance signals are entered to the enhancer circuit and scanning speed doubling circuit, thereby upgrading the picture quality.

Next, the operation of picture freeze mode will be described. In compliance with the timing chart of FIG. 3, the switch circuits 506, 510 and 518 are set to the b-position. For the n-th field of FIG. 3, the signals which have been motion-adaptive processed (the outputs of the motion-adaptive Y separation circuit 508, motion-adaptive C separation circuit 520 and motion-adaptive scanning line interpolation circuit 512) are fed back and stored in the frame memories 507 and 519 and field memory 511, respectively. For the (n+1)th field and later, the frame memories 507 and 519 and field memory 511 are write-disabled, and signals of the n-th field are read out in every field. In the (n+1)th field and later, the switch circuits 509, 513 and 521 are set to the b-position by the control signals S3 and S4 in FIG. 3 so that the output signals ($y_r$, $y_i$, $c_r$) of the frame memories 507 and 519 and field memory 511 are led directly to the switch circuits 514, 515, 523 and 524. Even in this case, the interpolated scanning line signal $c_i$ of the chrominance signal processing system is produced for each field by the scanning line interpolation circuit 522. With the freeze start field being the n-th field, $y_r$ and $c_r$ are real scanning line signals and $y_e$ and $c_i$ are interpolated scanning line signals in the (n+2m)th field, while $y_i$ and $c_i$ are real scanning line signals and $y_r$ and $c_r$ are interpolated scanning line signals in the (n+2m+1) field. The switch circuits 514, 515, 523 and 524 are reversed in every field by the control signals S5 and S6 in FIG. 3, and the correct relationship of the real and interpolated scanning lines is maintained in freeze mode.

Although in the above embodiment a digitized video signal is applied to the input terminal 501, this invention is also applicable to the case in which the band-pass filter 516 and color difference demodulator 517 in the chrominance signal processing system are of analog type, with a luminance signal A/D converter being placed at the input of the switch circuit and with a chrominance A/D converter being placed at the input of the switch circuit 518.

Although in the above embodiment, scanning line interpolation of the chrominance signal processing system is implemented by the in-field signal processing, this invention is also applicable to the case in which the chrominance signal processing system is also provided with a field memory for scanning line interpolation in the same manner as for the luminance signal processing system to form a scanning line interpolation circuit of motion-adaptive type.

Figure 6:
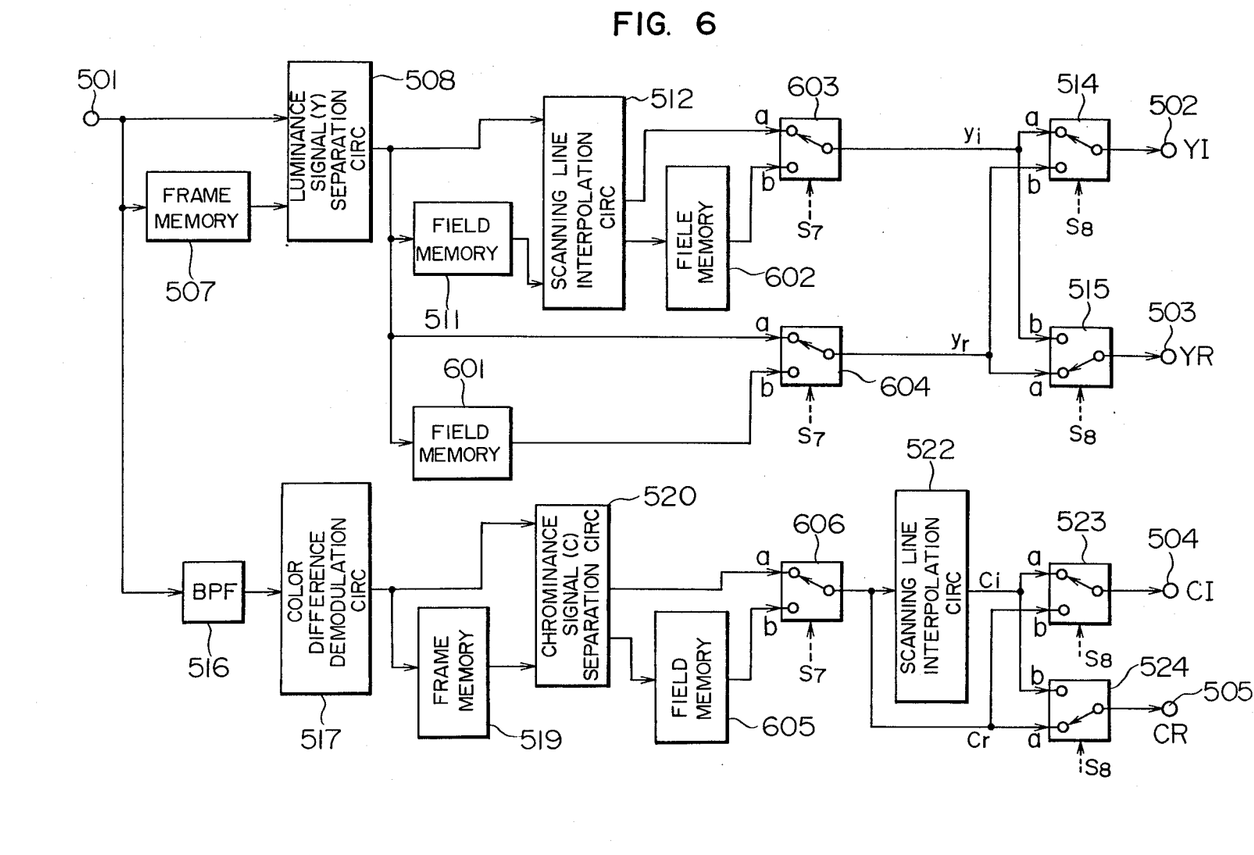
Figure 7:
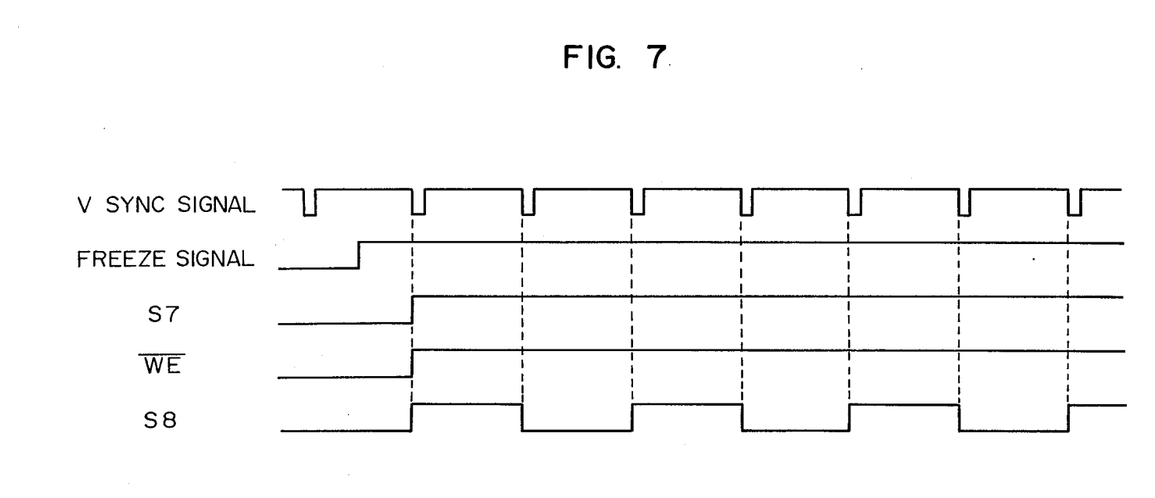
FIG. 7 is a timing chart of the signal which controls the freezing operation of the circuit shown in FIG. 6.

FIG. 6 shows another embodiment of this invention. In the figure, indicated by 601, 602 and 605 are field memories and 603, 604 and 606 are switch circuits. The remaining circuit blocks are identical to those of the preceding embodiment of FIG. 5. This embodiment is provided with field memories 601, 602 and 605 dedicated to a frozen picture. At freezing, the signals stored in the field memories 601, 602 and 605 are read out for each field. The switch circuits 603, 604, 606, 514, 515, 523 and 524 are controlled using the control signals S7 and S8 shown in FIG. 7. In the first field after the freeze signal has arrived, the switch circuits 603, 604 and 606 are set to the b-position in response to the control signal S7 so that the signals are read out of the frame memories 601, 602 and 605. At this time, the frame memories 601, 602 and 605 are write-disabled by the $\overline{WE}$ signal in FIG. 7, and they hold picture data of the (n−1)th field invariably. The switch circuits 514, 515, 523 and 524 are controlled by the control signal S8 in FIG. 7, and they deliver the input signals selectively as the real scanning line signal and interpolated scanning line signal, and a high-quality frozen picture is obtained. In this embodiment, the frame memories 601, 602 and 605 are provided for preserving a frozen picture, separately from the frame memories 507 and 519 and field memory 511 used for Y/C separation and scanning line interpolation.

It is also possible for the above embodiment to use the field memory 511 commonly for the field memory 601, and it is further possible to have a band-pass filter 516 and color difference demodulator 517 of analog type and use a field memory for scanning line interpolation of chrominance signal processing system.

Figure 8:
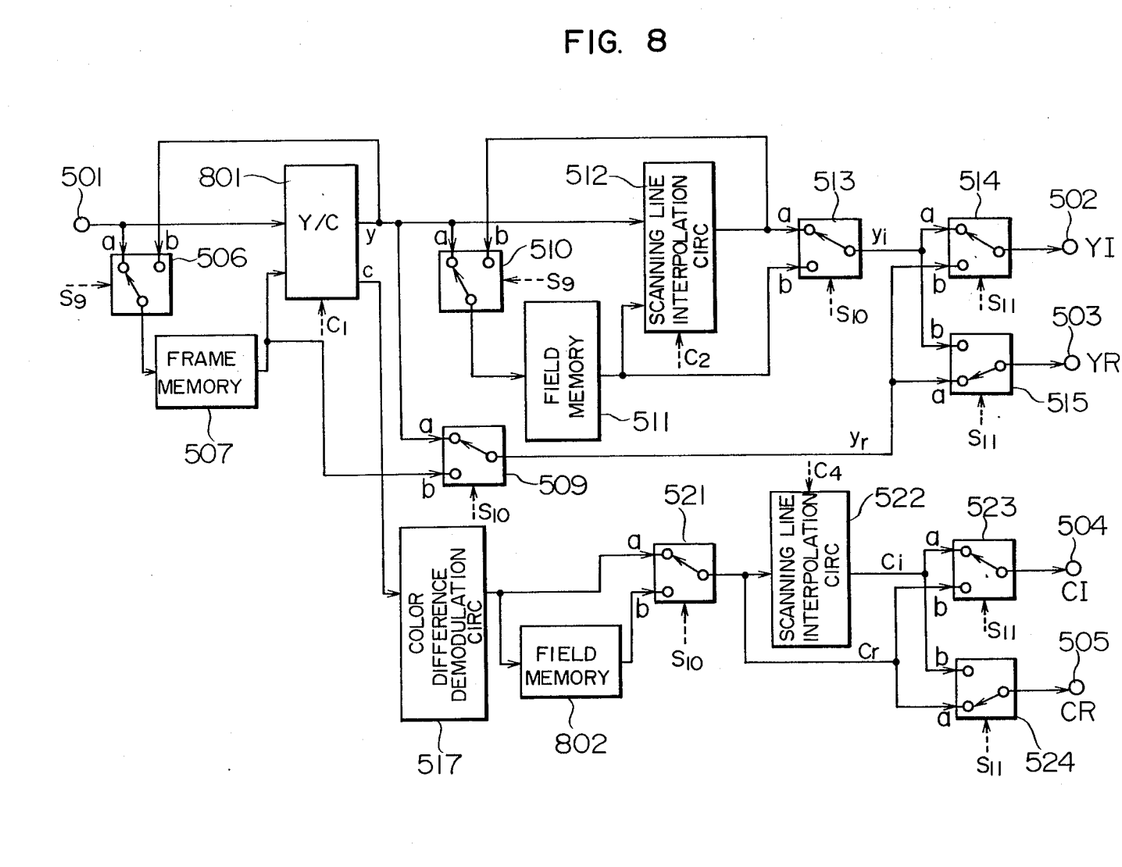

FIG. 8 shows a further embodiment of this invention. In the figure, indicated by 801 is a Y/C separation circuit of motion-adaptive type and 802 is a frame memory. The remaining circuit blocks are identical to those of the preceding embodiment of FIG. 5. In this embodiment, motion-adaptive Y/C separation is implemented with a single circuit 801. In normal reproduction mode, the switch circuits 506, 509, 510, 513, 514, 515, 521, 523 and 524 in FIG. 8 are set to the a-position. The digitized video signal received on the input terminal 501 is separated into a luminance signal (y) and a chrominance signal (c) by the motion-adaptive Y/C separation circuit 801. After scanning line interpolation for these signals, the real scanning line signals YR and CR and the interpolated scanning line signals Y1 and C1 are obtained.

Figures 9, 10:
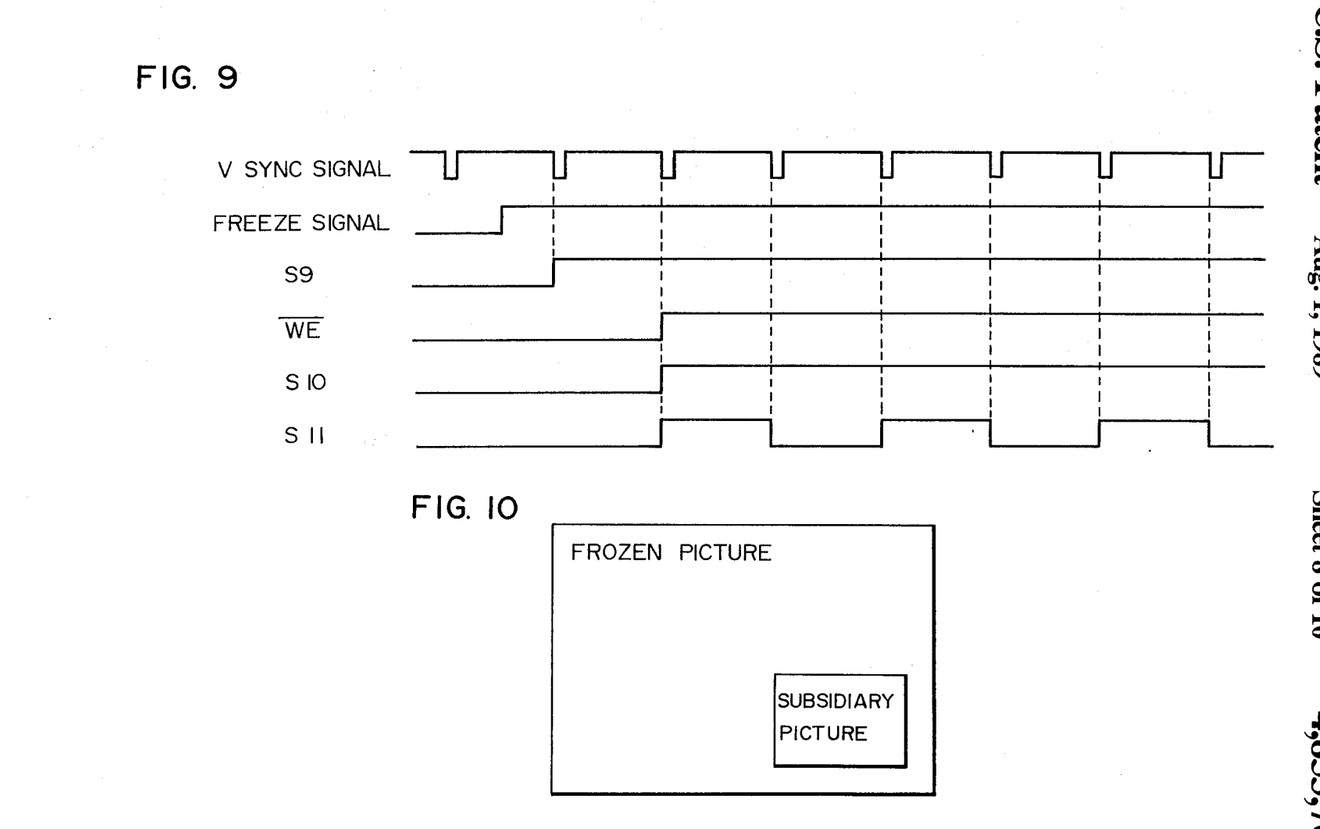
FIG. 9 is a timing chart of the signal which controls the freezing operation of the circuit shown in FIG. 8.
FIG. 10 is a diagram showing the concept of the combined reproduction of main and subordinate pictures, or PinP function.

In picture freeze mode, the switch circuits are controlled in compliance with the timing chart shown in FIG. 9. In the first field following the arrival of the freeze signal, the switch circuits 506 and 510 are set to the b-position in response to the signal S9, and consequently the luminance signal of the n-th field is stored in the frame memory 507, the chrominance signal is stored in the field memory 802, and the interpolated scanning line signal is stored in the field memory 511. The frame memory 507 and field memories 511 and 802 are write-disabled for the (n+1)th field and later by the $\overline{WE}$ signal so that they preserve information of the n-th field, and it is read out for every field. In the (n+1)th field and later, the switch circuits 509, 513 and 521 are set to the b-position in response to the control signal S10, and the signals from the frame memory 507 and field memories 511 and 802 are delivered. The resulting real scanning line signals $y_r$ and $c_r$ and interpolated scanning line signals $y_i$ and $c_i$ for freezing are switched by the switch circuits 514, 515, 523 and 524, and high-quality frozen picture signals are produced. It is possible for this embodiment, as in the preceding embodiments of FIGS. 5 and 6, to carry out the motion-adaptive scanning line interpolation for the chrominance signal using field memories.

Although the foregoing embodiments are designed to obtain a high-quality frozen picture by switching the real scanning line and interpolated scanning line, special functions such as picture-in-picture (PinP) and multiple pictures can be realized by addition of some circuits.

FIG. 10 shows an example of screen layout of PinP. This special function necessitates a memory for storing temporarily the subordinate (subsidiary) picture signal. The field memory used for signal processing of the main picture can be shared for this purpose. Supposing display of a subordinate picture signal in a frozen picture, with the subordinate picture having a size 1/9 that of the main picture, the subordinate picture will have scanning lines reduced to $\frac{1}{3}$. Since interpolated scanning lines are added to them, scanning lines of the subordinate picture is actually reduced to $\frac{2}{3}$.

Figure 11:
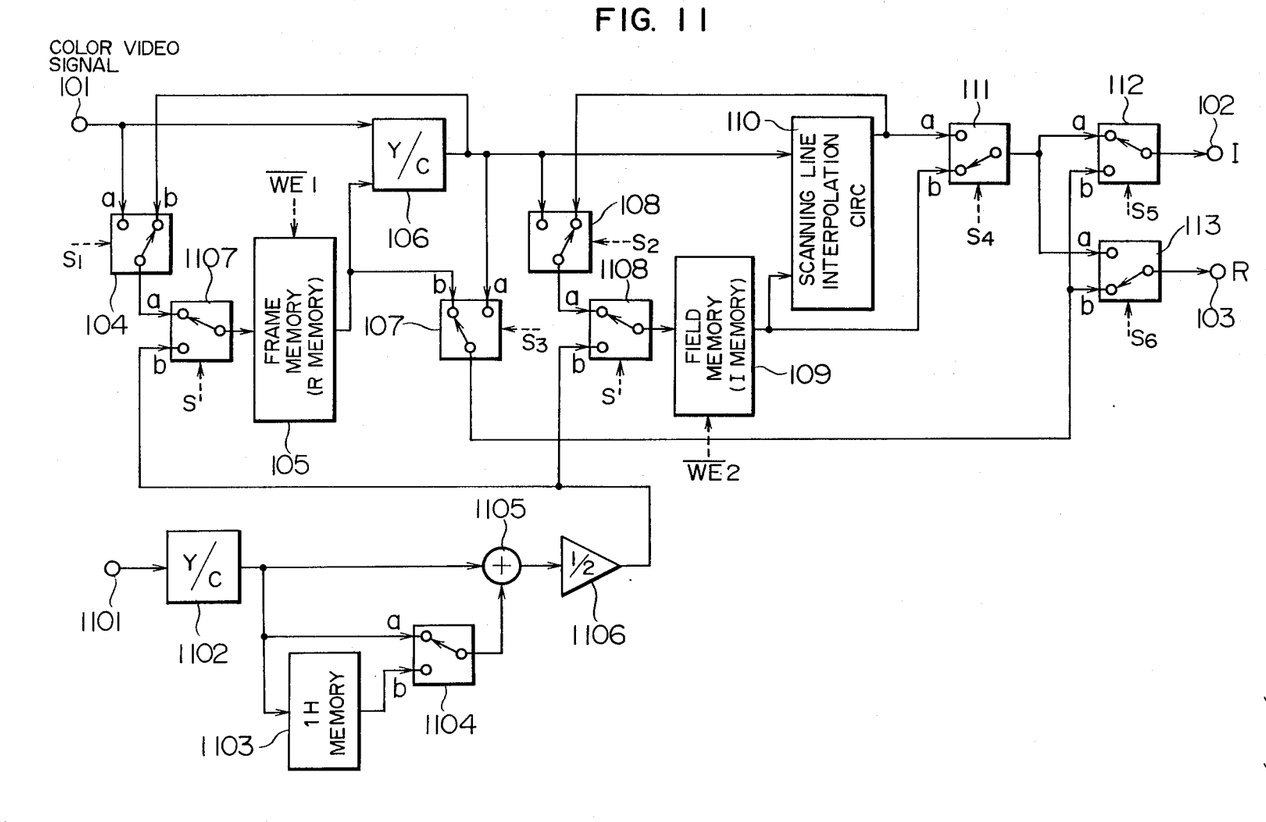
FIG. 11 is a block diagram of the signal processing circuit according to another embodiment of this invention including the circuit for producing a PinP picture.

FIG. 11 shows in block diagram the circuit for carrying out PinP. In the figure, indicated by 1101 is an input terminal for receiving the video signal for the subordinate picture, 1102 is a Y/C separation circuit, 1103 is a 1H memory, 1104 is a switch circuit, 1105 is an adder, 1106 is a coefficient multiplier, and 1107 and 1108 are switch circuits for switching the main picture signal and subordinate picture signal. The remaining circuit blocks are identical to those of FIG. 2.

The coefficient multiplier 1106 in FIG. 11 provides a subordinate picture signal, which is the output of the Y/C separation circuit when the switch circuit 1104 is set to the a-position, or the mean value of two adjoining lines when it is set to the b-position. In case of freezing the main picture and adding a subordinate picture, the two switch circuits 1107 and 1108 are set to the b-position in response to the viewer's operation, and the subordinate picture signal is entered to the frame memory 105 (will be termed "R memory") and field memory 109 (will be termed "I memory"). With the subordinate picture signal being supplied to the R memory and I memory, the memory write control signals WE1 and WE2 are made active at every third line and once for three pixels, and each memory stores ⅓ of picture. There are two conceivable manners of storing the subordinate picture signal as shown in FIGS. 12A and 12B.

Figure 12A:
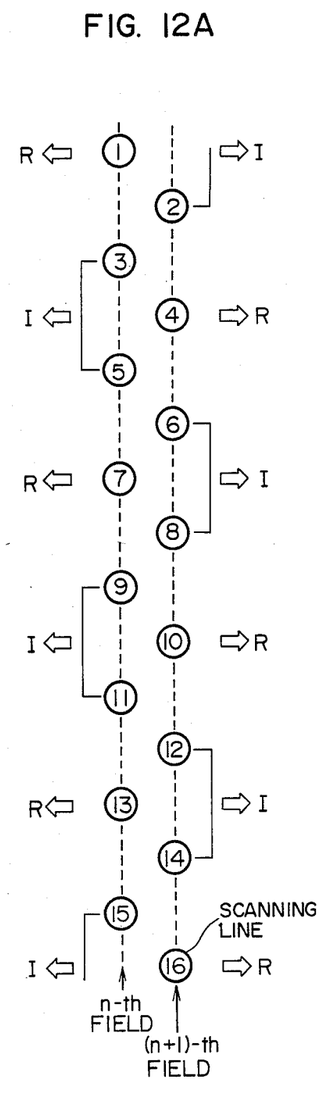
FIG. 12A and 12B are diagrams showing the manner of storing the subordinate picture data.
Figure 12B:
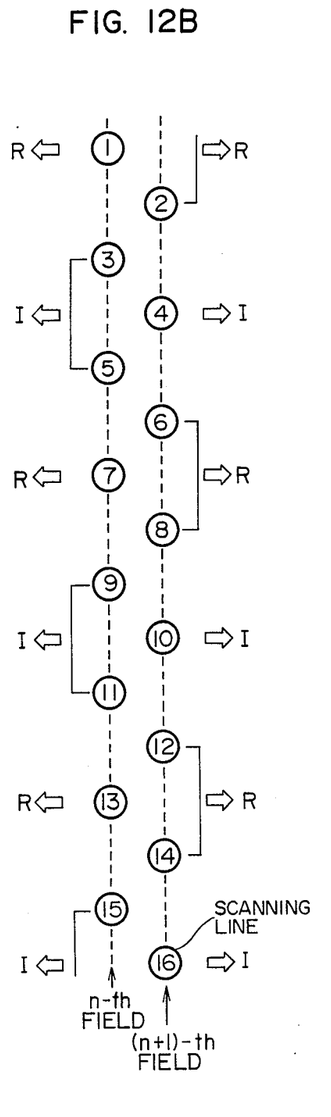

FIGS. 12A and 12B are diagrams of scanning lines viewed from the screen side, and circles represent scanning lines. FIG. 12A is the case where scanning lines 1, 7, 13, and so on of the n-th field are stored in the R memory, the mean value of scanning lines 3 and 5 and the mean value of 9 and 11 are stored in the I memory, and for the (n+1)th field scanning lines 4, 12, 16, and so on are stored in the R memory and the mean value of scanning lines 6 and 8 and the mean value of 12 and 14 are stored in the I memory. In the case of FIG. 12B, the memory for the (n+1)th field is assigned oppositely to the case of FIG. 12A.

In case the subordinate picture signal is stored in the manner of FIG. 12A, it is necessary for the switch circuits (e.g., 112 and 113 in FIG. 11), which switch the real scanning line signal and interpolated scanning line signal in the portion of subordinate picture in the frozen picture, to be controlled in the same way as in normal reproduction mode. On the other hand, in the manner of FIG. 12B, the stored signal has the scanning line relation coincident with that of the frozen picture, and therefore the above switch circuits can be left in the state of freeze mode. Accordingly, the manner of FIG. 12B for storing the subordinate picture makes circuit control simpler in carrying out PinP with a frozen main picture.

The embodiment of FIG. 11 is operative in performing PinP by merely adding some circuits for producing the subordinate signal and a circuit for producing the memory write control signals WE1 and WE2.

Although the embodiment of FIG. 11 is provided with the input terminal 1101 for receiving the subordinate picture signal and the Y/C separation circuit 1102, if it is allowed to confine the main picture to a frozen picture, the input terminal 1101 may be substituted by the input terminal 101, and the Y/C separation circuit 1102 may be substituted by the Y/C separation circuit 106. In this case, however, if the Y/C separation circuit 106 is of motion-adaptive type, the process is invariably oriented to motion pictures, i.e., in-field Y/C separation.

We claim:

1. A video signal processing circuit capable of reproducing a still picture from a color video signal, comprising:
luminance signal/chrominance signal separation means arranged for receiving a color video signal;
scanning line interpolation means in an electrical connection to receive the output of said separation means;
first memory means in an electrical connection to receive and store therein the output of said separation means;
second memory means in an electrical connection to receive and store therein the output of said interpolation means; and
first and second switching means each connected to receive the outputs of said first and second memory means through switches, said first and second switching means being operable so that said first switching means delivers therethrough the outputs of said first and second memory means alternately and said second switching means delivers therethrough the outputs of said second and first memory means alternately, the alternation for said delivery by said first and second switching means being effected at a frequency identical with the field frequency of said video signal.

2. A signal processing circuit according to claim 1, further comprising a subsidiary picture signal processing circuit, a fifth switch interconnected between said first switch and said first memory and a sixth switch interconnected between said second switch and said second memory, said fifth switch having its first input terminal connected with the output of said first switch while said sixth switch having its first input terminal connected with the output of said second switch, the output of said subsidiary picture signal processing circuit being connected with a second input terminal of said fifth switch and a second input terminal of said sixth switch.

3. A video signal processing circuit capable of reproducing a still picture signal from a color video signal, comprising:
a luminance signal/chrominance signal separation circuit of a motion adaptive type arranged for receiving a color video signal and for deriving luminance and chrominance components of the color video signal;
a first switch arranged for receiving said color video signal and the output of said separation circuit;
a first memory interconnected between said first switch and said separation circuit;
a scanning line interpolation circuit of a motion adaptive type in an electrical connection to receive the output of said separation circuit;
a second switch arranged for receiving the output of said separation circuit and the output of said interpolation circuit;
a second memory interconnected between said second switch and said interpolation circuit, said first and second switches being arranged to normally deliver therethrough said color video signal and the output of said separation circuit to said first and second memories, respectively, and to deliver therethrough the output of said separation circuit and the output of said interpolation circuit to said first and second memories, respectively, responsive to control signals supplied to said switches and representative of initiation of freezing of a picture for a still picture reproduction;
first and second switching means connected to receive the outputs of said first and second memories through third and fourth switches, respectively, said first and second switching means being operable so that said first switching means delivers therethrough the outputs of said first and second memories alternately and said second switching means delivers therethrough the outputs of said second and first memory means alternately, the alternation for said delivery by said first and second switching means being effected at a frequency identical with the field frequency of said video signal.

4. A signal processing circuit according to claim 3, in which:

said luminance signal/chrominance signal separation circuit has first and second luminance signal/chrominance signal separation circuit sections for extracting the luminance component and chrominance component, respectively, arranged for receiving said color video signal;

said first switch having first and second switch sections arranged for receiving the luminance and chrominance components of said color video signal, respectively, and the outputs of said first and second separation circuit sections, respectively;

said first memory having first and second memory sections interconnected between said first switch section and said first separation circuit section and between said second switch section and said second separation circuit section, respectively;

said scanning line interpolation circuit has first and second scanning line interpolation circuit sections, said first scanning line interpolation circuit section being in an electrical connection to receive the output of said first separation circuit section, while said second scanning line interpolation circuit section being connected with the output of said second separation circuit section through a fifth switch;

said second switch has a third switch section arranged for receiving the output of said first separation circuit section and the output of said first interpolation circuit section;

said second memory has a third memory section interconnected between said third switch section and said first interpolation circuit section, said first switch section being arranged to normally deliver therethrough the luminance component of said color video signal to said first memory section and to deliver therethrough the output of said first separation circuit section to said first memory section responsive to a first control signal supplied to said first switch section and representative of initiation of freezing of a picture for a still picture reproduction, said second switch section being arranged to normally deliver therethrough the chrominance component of said color video signal to said second memory section and to deliver therethrough the output of said second separation circuit section to said second memory section responsive to said first control signal supplied to said second switch section and representative of initiation of freezing of a picture for a still picture reproduction, and said third switch section being arranged to normally deliver therethrough the output of said first separation circuit section to said third memory section and to deliver the output of said first interpolation circuit section to said third memory section responsive to a second control signal supplied to said third switch section representative of initiation of freezing of a picture for a still picture reproduction; and said first switching means has first and second switching means sections while said second switching means has third and fourth switching means sections, said first and second switching means sections being connected to receive the outputs of said first and third memory sections through third and fourth switches, respectively, said first and second switching means sections being operable so that said first switching means section delivers therethrough the outputs of said first and third memory sections alternately and said second switching means section delivers therethrough the outputs of said third and first memory sections alternately, the alternation for said delivery by said first and second switching means sections being effected at a frequency identical with the field frequency of said video signal, said third and fourth switching means sections being connected to receive the output of said second memory section through said fifth switch and the output of said second interpolation circuit section, said third and fourth switching means sections being operable so that said third switching means section delivers therethrough the output of said second memory section and the output of said second interpolation circuit section alternately and said fourth switching means section delivers therethrough the output of said second interpolation circuit section and the output of said second memory section alternately, the alternation for said delivery by said third and fourth switching means sections being effected at a frequency identical with the field frequency of said video signal.

5. A signal processing circuit according to claim 3, in which:

said scanning line interpolation circuit has first and second scanning line interpolation circuit sections, said first scanning line interpolation circuit section being in an electrical connection to receive the luminance component of said video signal from said separation circuit, while said second scanning line interpolation circuit section being connected with the output of said separation circuit through a fifth switch to receive the chrominance component of said video signal;

a third memory is interconnected between said separation circuit and said fifth switch to store the chrominance component of said video signal;

said second switch has a third switch section arranged for receiving the output of said separation circuit and the output of said first interpolation circuit section;

said second memory has a third memory section interconnected between said third switch section and said first interpolation circuit section, said third switch section being arranged to normally deliver therethrough the output of said separation circuit to said third memory section and to deliver the output of said interpolation circuit to said third memory section responsive to another control signal supplied to said third switch section representative of initiation of freezing of a picture for a still picture reproduction; and said first switching means has first and second switching means sections while said second switching means has third and fourth switching means sections, said first and second switching means sections being connected to receive the outputs of said first memory and said third memory section through third and fourth switches, respectively, said first and second switching means sections being operable so that said first switching means section delivers therethrough the outputs of said first memory and said third memory section alternately and said second switching means section delivers therethrough the outputs of said third memory section and said first memory alternately, the alternation for said delivery by said first and second switching means sections being effected at a frequency identical with the field frequency of said video signal, said third and fourth switching means sections being connected to receive the output of said third memory through said fifth switch and the output of said second interpolation circuit section, respectively, said third and fourth switching means sections being operable so that said third switching means section delivers therethrough the output of said third memory and the output of said second interpolation circuit section alternately and said fourth switching means section delivers therethrough the output of said second interpolation circuit section and the output of said third memory alternately, the alternation for said delivery by said third and fourth switching means sections being effected at a frequency identical with the field frequency of said video signal.

* * * * *

UNITED STATES PATENT AND TRADEMARK OFFICE
CERTIFICATE OF CORRECTION

PATENT NO.   :   4,853,765
DATED        :   Aug. 1, 1989
INVENTOR(S)  :   Katsumata et al.

It is certified that error appears in the above-identified patent and that said Letters Patent is hereby corrected as shown below:

IN THE TITLE PAGE:

Delete "[73]  Assignee:   Hitachi, Ltd., Tokyo, Japan" and insert:
   --[73]  Assignees:  Hitachi, Ltd., Tokyo, Japan; and
                       Hitachi Video Engineering,
                       Incorporated, Kanagawa-ken, Japan--

Signed and Sealed this

Twenty-eighth Day of May, 1991

*Attest:*

HARRY F. MANBECK, JR.

*Attesting Officer*    *Commissioner of Patents and Trademarks*